United States Patent
Feiner

(10) Patent No.: US 10,853,760 B2
(45) Date of Patent: Dec. 1, 2020

(54) SYSTEM AND METHOD FOR REDUCING WASTAGE OF FRESH PRODUCE IN RETAIL STORES

(71) Applicant: POLYMER LOGISTICS (ISRAEL) LTD., Hod Hasharon (IL)

(72) Inventor: Gideon Feiner, Ramat Hasharon (IL)

(73) Assignee: Moshe Mizrahi, Tel Aviv (IL)

( * ) Notice: Subject to any disclaimer, the term of this patent is extended or adjusted under 35 U.S.C. 154(b) by 1199 days.

(21) Appl. No.: 14/920,915

(22) Filed: Oct. 23, 2015

(65) Prior Publication Data
US 2017/0116565 A1  Apr. 27, 2017

(51) Int. Cl.
*G01K 1/02* (2006.01)
*G01N 33/02* (2006.01)
*G06Q 10/08* (2012.01)
*G06Q 50/28* (2012.01)

(52) U.S. Cl.
CPC ....... *G06Q 10/087* (2013.01); *G06Q 10/0832* (2013.01); *G06Q 50/28* (2013.01)

(58) Field of Classification Search
CPC ............. G01K 1/02; G01K 1/08; G01K 13/00
See application file for complete search history.

(56) References Cited

U.S. PATENT DOCUMENTS

| | | | | |
|---|---|---|---|---|
| 6,850,861 B1 * | 2/2005 | Faiola | ............ | G01K 1/024 |
| | | | | 702/130 |
| 6,976,368 B1 * | 12/2005 | Lamstaes | ............ | F25D 29/00 |
| | | | | 236/15 BB |
| 7,495,558 B2 * | 2/2009 | Pope | ............ | G06K 19/0717 |
| | | | | 340/572.1 |
| 8,321,303 B1 | 11/2012 | Krishnamurthy et al. | | |
| 10,309,945 B2 * | 6/2019 | Mandava | ............ | G01K 1/024 |
| 2008/0294488 A1 * | 11/2008 | Gupta | ............ | G06Q 10/087 |
| | | | | 705/7.26 |

(Continued)

OTHER PUBLICATIONS

Anonymous: 11 RFID gates—where are they and why?—RFID Arena 11,•Oct. 23, 2012 (Oct. 23, 2012), XP055491580, URL:http://www.rfidarena.com/2012/10/23/rf id-gates---where-are-they-and-why.aspx, [retrieved on Jul. 10, 2018], *pp. 1-3*.

(Continued)

*Primary Examiner* — Talia F Crawley
(74) *Attorney, Agent, or Firm* — Mark M. Friedman

(57) ABSTRACT

In a retail store having a sales area and a back-store area including a storage area, a system for managing produce includes a sensor arrangement for reading distinct identifiers associated with containers passing along a produce transfer path from the back-store area to the sales area. A processing system maintains a database including a record for each container received to the back-store area, each container record including a produce type and freshness data. For each produce type, the system determines at least one container of the given produce type in the back-store area having a shortest salability period as derived from the freshness data, this being designated a priority container, The system monitors whether containers transferred along the produce transfer path correspond to the priority containers. If a container other than a priority container is transferred, at least one enforcement action is actuated.

18 Claims, 6 Drawing Sheets

(56) References Cited

U.S. PATENT DOCUMENTS

| | | | | |
|---|---|---|---|---|
| 2012/0109789 A1* | 5/2012 | Bhatt | .................... | G06Q 10/063 |
| | | | | 705/29 |
| 2012/0109842 A1* | 5/2012 | Bhatt | ................ | G06Q 10/0833 |
| | | | | 705/333 |
| 2013/0214938 A1* | 8/2013 | Kim | ....................... | G06Q 30/00 |
| | | | | 340/870.07 |
| 2014/0055244 A1* | 2/2014 | Burchell | .................. | G01K 3/04 |
| | | | | 340/10.1 |
| 2014/0313055 A1* | 10/2014 | Warkentin | ............. | G01N 33/02 |
| | | | | 340/870.16 |
| 2015/0316521 A1* | 11/2015 | Goldman | .............. | A23L 3/3418 |
| | | | | 73/31.05 |
| 2017/0098187 A1* | 4/2017 | Jung | .................. | G06Q 10/0832 |
| 2018/0005295 A1* | 1/2018 | Howell | ............. | G06Q 30/0631 |
| 2018/0197135 A1* | 7/2018 | Moyer | ................... | G06Q 50/10 |
| 2019/0213537 A1* | 7/2019 | Mehring | ............ | G06Q 10/0832 |

OTHER PUBLICATIONS

Anonymous: 11 GS1-128—Wikipedia 11, •Sep. 24, 2015 (Sep. 24, 2015), pp. 1-6, XP055559368, Retrieved from the Internet: https://en.wikipedia.org/w/index.php?title=GS1-128&oldid=682604742 [retrieved on Feb. 20, 2019] *the whole document*.

* cited by examiner

SYSTEM AND METHOD FOR REDUCING WASTAGE OF FRESH PRODUCE IN RETAIL STORES

FIELD AND BACKGROUND OF THE INVENTION

The present invention relates to handling of fresh produce in a retail environment and, in particular, it concerns a system and method for reducing wastage of fresh produce in retail stores.

Current practices in retail stores with regard to fresh produce (primarily fruit and vegetables) lead to significant proportions of spoilage. Particular causes of such spoilage which could be avoided relate to transfer of produce from back-store storage to the sales floor in the wrong order, as well as improper refilling techniques.

It would be advantageous to provide systems and methods which would help to reduce or eliminate such causes of spoilage.

SUMMARY OF THE INVENTION

The present invention is a system and method for reducing wastage of fresh produce in retail stores.

According to the teachings of the present invention there is provided, a system for managing produce in a retail store having a sales area for sale of produce and a back-store area including at least one storage area for pre-sale storage of produce, the produce being supplied in containers having distinct container identifiers, the system comprising: (a) a sensor arrangement including at least one sensor configured to collect data sufficient to determine a container identifier, the sensor arrangement being deployed to read container identifiers for containers passing along a produce transfer path from the back-store area to the sales area; (b) a processing system including at least one processor, the processing system being in data communication with the sensor arrangement to receive the data; and (c) a user interface associated with the processing system, wherein the processing system is configured: (i) to maintain a database including a record for each container of produce received to the back-store area, each container record including a produce type and freshness data, (ii) for each produce type, to determine at least one container identifier corresponding to at least one container of the given produce type in the back-store area having a shortest salability period as derived from the freshness data, the at least one container being designated a priority container, (iii) to monitor the data from the sensor arrangement to identify containers transferred along the produce transfer path from the back-store area to the sales area, and (iv) on transfer of a container other than a priority container from the back-store area to the sales area, actuating at least one enforcement action selected from the group consisting of: generating an audible or visual alert; forwarding a message to a communications device; and recording information sufficient to identify a person who transferred the container.

According to a further feature of an embodiment of the present invention, the freshness data of each container record of the database comprises a date selected from the group consisting of: a harvest date; and an expiration date.

According to a further feature of an embodiment of the present invention, the freshness data of each container record of the database comprises data relating to temperature of storage conditions and/or shipping conditions for at least one period from harvesting to arrival in the retail store.

According to a further feature of an embodiment of the present invention, the processing system is further responsive to a sales area replenish requirement for a given produce type to generate an output via the user interface to provide information to facilitate manual selection of the priority container of the given produce type.

According to a further feature of an embodiment of the present invention, the processing system is further configured: (a) on transfer of a container from the back-store area to the sales area, to update the database to maintain a record of a total quantity of each produce type currently in the back-store area; and (b) intermittently or on demand, to apply reorder criteria to the database so as to generate an order for new produce based at least in part on the total quantity of each produce type currently in the back-store area.

According to a further feature of an embodiment of the present invention, the sensor arrangement is further configured to collect data sufficient to distinguish between containers passing from the back-store area to the sales area and containers passing from the sales area to the back-store area.

According to a further feature of an embodiment of the present invention, the processing system is further configured to be responsive to return of a container from the sales area to the back-store area to generate a sales area replenish requirement for the corresponding produce type unless return of the container was preceded within a given time period by transfer of a different container of the same produce type from the back-store area to the sales area.

According to a further feature of an embodiment of the present invention, the processing system is further configured to determine for each container returning from the sales area to the back-store area a display time from when the container was transferred from the back-store area to the sales area and, if the display time is less than a predefined minimum display time, generating an improper-refilling alert.

According to a further feature of an embodiment of the present invention, the processing system is further configured: (a) to determine for each container transferred from the back-store area to the sales area a latest expected return date; and (b) if the container has not been returned from the sales area to the back-store area by the latest expected return date, to generate an alert.

According to a further feature of an embodiment of the present invention, the at least one sensor comprises at least one camera deployed for sampling images of containers passing along the produce transfer path.

According to a further feature of an embodiment of the present invention, the processing system is further configured to process images from the at least one camera so as to locate and read from within the images an optically readable container identifier associated with at least one container.

According to a further feature of an embodiment of the present invention, the processing system is further configured to process images from the at least one camera so as to determine a direction of transfer of a container along the produce transfer path.

According to a further feature of an embodiment of the present invention, the at least one sensor comprises at least one RFID gate deployed for reading an RFID container identifier of a container passing a location along the produce transfer path.

According to a further feature of an embodiment of the present invention, the RFID gate is configured to determine a direction of transfer of a container along the produce transfer path.

There is also provided according to the teachings of an embodiment of the present invention, a system for managing produce in a retail store having a sales area for sale of produce and a back-store area including at least one storage area for pre-sale storage of produce, the produce being supplied in containers having distinct container identifiers, the system comprising: (a) a sensor arrangement including at least one sensor configured to collect data sufficient to determine a container identifier, the sensor arrangement being deployed to read container identifiers for containers passing along a produce transfer path from the back-store area to the sales area; (b) a processing system including at least one processor, the processing system being in data communication with the sensor arrangement to receive the data; and (c) a user interface associated with the processing system, wherein the processing system is configured: (i) to maintain a database including a record for each container of produce received to the back-store area, each container record including a produce type and a freshness data, (ii) for each produce type, to determine at least one container identifier corresponding to at least one container of the given produce type in the back-store area having a shortest salability period as derived from the freshness data, the at least one container being designated a priority container, and (iii) responsive to a sales area replenish requirement for a given produce type, to generate an output via the user interface to provide information to facilitate manual selection of the priority container of the given produce type.

There is also provided according to the teachings of an embodiment of the present invention, a system for managing produce in a retail store having a sales area for sale of produce and a back-store area including at least one storage area for pre-sale storage of produce, the produce being supplied in containers having distinct container identifiers, the system comprising: (a) a sensor arrangement including at least one sensor configured to collect data sufficient to determine a container identifier, the sensor arrangement being deployed to read container identifiers for containers passing along a produce transfer path from the back-store area to the sales area, the sensor arrangement being further configured to collect data sufficient to distinguish between containers passing from the back-store area to the sales area and containers passing from the sales area to the back-store area; (b) a processing system including at least one processor, the processing system being in data communication with the sensor arrangement to receive the data; and (c) a user interface associated with the processing system, wherein the processing system is configured: (i) to maintain a database including a record for each container of produce received to the back-store area, each container record including a produce type, and (ii) to be responsive to return of a container from the sales area to the back-store area to generate a sales area replenish requirement for the corresponding produce type unless return of the container was preceded within a given time period by transfer of a different container of the same produce type from the back-store area to the sales area.

There is also provided according to the teachings of an embodiment of the present invention, a system for managing produce in a retail store having a sales area for sale of produce and a back-store area including at least one storage area for pre-sale storage of produce, the produce being supplied in containers having distinct container identifiers, the system comprising: (a) a sensor arrangement including at least one sensor configured to collect data sufficient to determine a container identifier, the sensor arrangement being deployed to read container identifiers for containers passing along a produce transfer path from the back-store area to the sales area, the sensor arrangement being further configured to collect data sufficient to distinguish between containers passing from the back-store area to the sales area and containers passing from the sales area to the back-store area; (b) a processing system including at least one processor, the processing system being in data communication with the sensor arrangement to receive the data; and (c) a user interface associated with the processing system, wherein the processing system is configured to process data from the sensor arrangement so as: (i) to obtain a container identifier for each container transferred from the back-store area to the sales area, (ii) to monitor for return of the container from the sales area to the back-store area, (iii) to determine a display time for the container from transfer to the sales area until return to the back-store area and, if the display time is less than a predefined minimum display time, generating an improper-refilling alert.

There is also provided according to the teachings of an embodiment of the present invention, a system for managing produce in a retail store having a sales area for sale of produce and a back-store area including at least one storage area for pre-sale storage of produce, the produce being supplied in containers having distinct container identifiers, the system comprising: (a) a sensor arrangement including at least one sensor configured to collect data sufficient to determine a container identifier, the sensor arrangement being deployed to read container identifiers for containers passing along a produce transfer path from the back-store area to the sales area, the sensor arrangement being further configured to collect data sufficient to distinguish between containers passing from the back-store area to the sales area and containers passing from the sales area to the back-store area; (b) a processing system including at least one processor, the processing system being in data communication with the sensor arrangement to receive the data; and (c) a user interface associated with the processing system, wherein the processing system is configured to process data from the sensor arrangement so as: (i) to obtain a container identifier for each container transferred from the back-store area to the sales area, (ii) to monitor for return of the container from the sales area to the back-store area, and (iii) if the container has not been returned from the sales area to the back-store area within a defined maximum dwell-time period after transfer to the sales area, to generate an alert.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a system and method for reducing wastage of fresh produce in retail stores.

The principles and operation of systems and methods according to the present invention may be better understood with reference to the drawings and the accompanying description.

Figure 1:
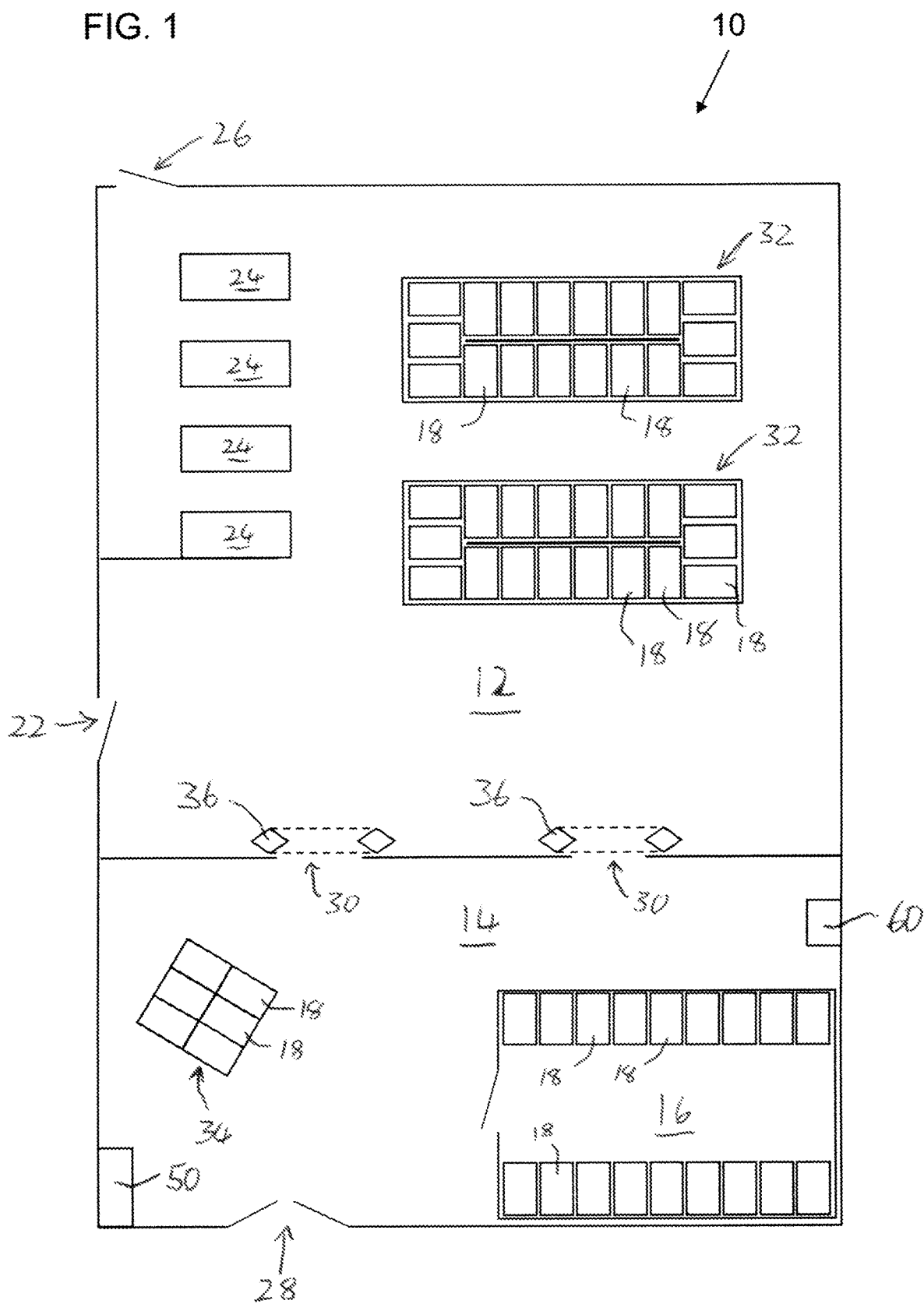
FIG. 1 is a schematic plan view of a retail store implementing a system and method for reducing wastage of fresh produce according to an embodiment of the present invention.

Referring now to the drawings, FIG. 1 shows schematically a retail store 10 that is provided with a system for managing produce according to an embodiment of the present invention. The store has a sales area 12 for sale of produce and a back-store area 14 which includes at least one storage area 16, preferably refrigerated, for pre-sale storage of produce. Sales area 12 typically has a customer entrance 22, check-outs 24 and a customer exit 26. Back-store area 14 typically has one or more trade entrance 28 for delivery of produce. One or more doorways 30 typically define one or more produce transfer paths along which produce is transferred from back-store storage area 16 to produce displays 32 on the sales floor.

It should be noted that the representation of FIG. 1 is highly schematic and not to scale. In particular, since the present invention addresses primarily "fresh produce", especially fruit and vegetables, storage facilities and sales-display shelving for long shelf-life products, which typically take up a major part of the back-store area and the sales area, respectively, have been omitted from this illustration.

The produce is supplied in containers 18, which are preferably used for both shipping and sales display of the produce. Thus, containers 18 are typically delivered in a palletized stack or walled container 34, from which they are transferred, with or without the pallet/container, to back-store storage 16, where they are kept until needed to replenish the produce displays 32.

The containers may be boxes or crates, typically formed from plastic, wood or cardboard, and may be single-use or reusable. In the case of reusable containers, the containers may advantageously be foldable or nesting containers. One particularly preferred but non-limiting example is a reusable plastic folding crate such as that illustrated in FIG. 2, used for shipping and sales-display.

Figure 2:
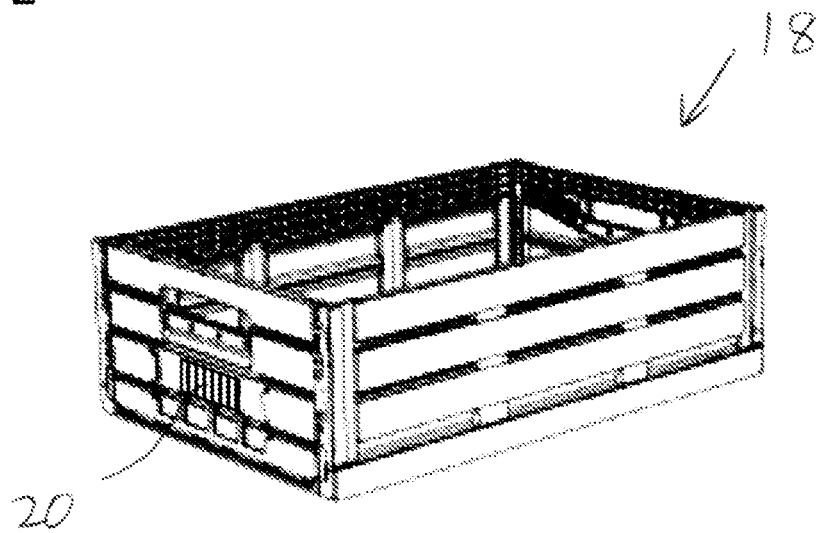
FIG. 2 is a schematic isometric view of an exemplary container for use in the retail store of FIG. 1 to implement an embodiment of the present invention.

Each container has a distinct container identifier 20 (FIG. 2). The container identifier may be any one or combination of identifiers sufficient to allow identification of the container by use of corresponding suitable sensor technology, including, but not limited to: an optically readable 1D or 2D barcode; an embossed (3D) barcode; an RFID tag or beacon; and any other passive or active component allowing identification of container. The identifier may be a permanent feature of the container, or may be a one-time barcode sticker attached to a container.

In order to implement various features of certain preferred embodiments of the present invention, the system of the present invention preferably includes a sensor arrangement including at least one sensor configured to collect data sufficient to determine a container identifier. The sensor arrangement is preferably deployed to read container identifiers 20 for containers 18 passing along the produce transfer path from back-store area 14 to sales area 12.

The particular implementation of the sensor arrangement is matched to the type of container identifier technology used. For example, when using containers with barcodes, the sensor arrangement includes an optical sensor, which may be a laser-based barcode reader or may be a camera with suitable associated processing components for detecting a 1D or 2D barcode, image segmentation, skew correction and barcode decoding, all as is well known in the art. For RFID identifiers, an RFID reader is used. In certain cases, it may be advantageous to provide sensors of multiple types, such as imaging sensors (cameras) and RFID readers, thereby allowing the hardware infrastructure to operate with containers from different sources that employ different identifier technology and/or providing various additional information, as will be discussed below.

In certain particularly preferred implementations, the sensor arrangement is implemented as part of a gate 36 associated with each doorway 30 or otherwise associated with the product transfer path. The term "gate" is used herein in the description and claims to refer to any structure or combination of structures which support a set of one or more sensors in such a manner that the sensors detect and allow identification of a container passing along the associated product transfer path. The implementation of "gates" in this manner is intended to ensure compliance with the system by rendering sensing of the containers passing along the product transfer path involuntary, i.e., without requiring any action by the employee moving the container.

Figure 3:
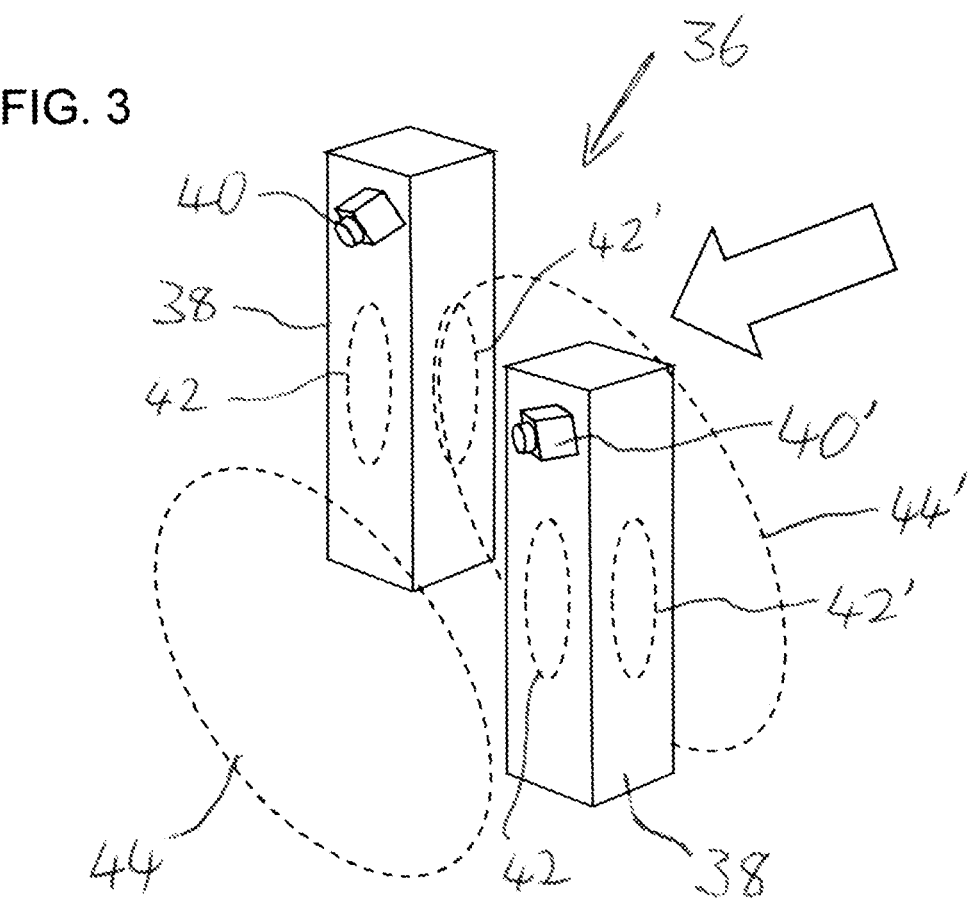
FIG. 3 is a schematic representation of gate implementation of a sensor arrangement from the retail store of FIG. 1.
Figure 4:
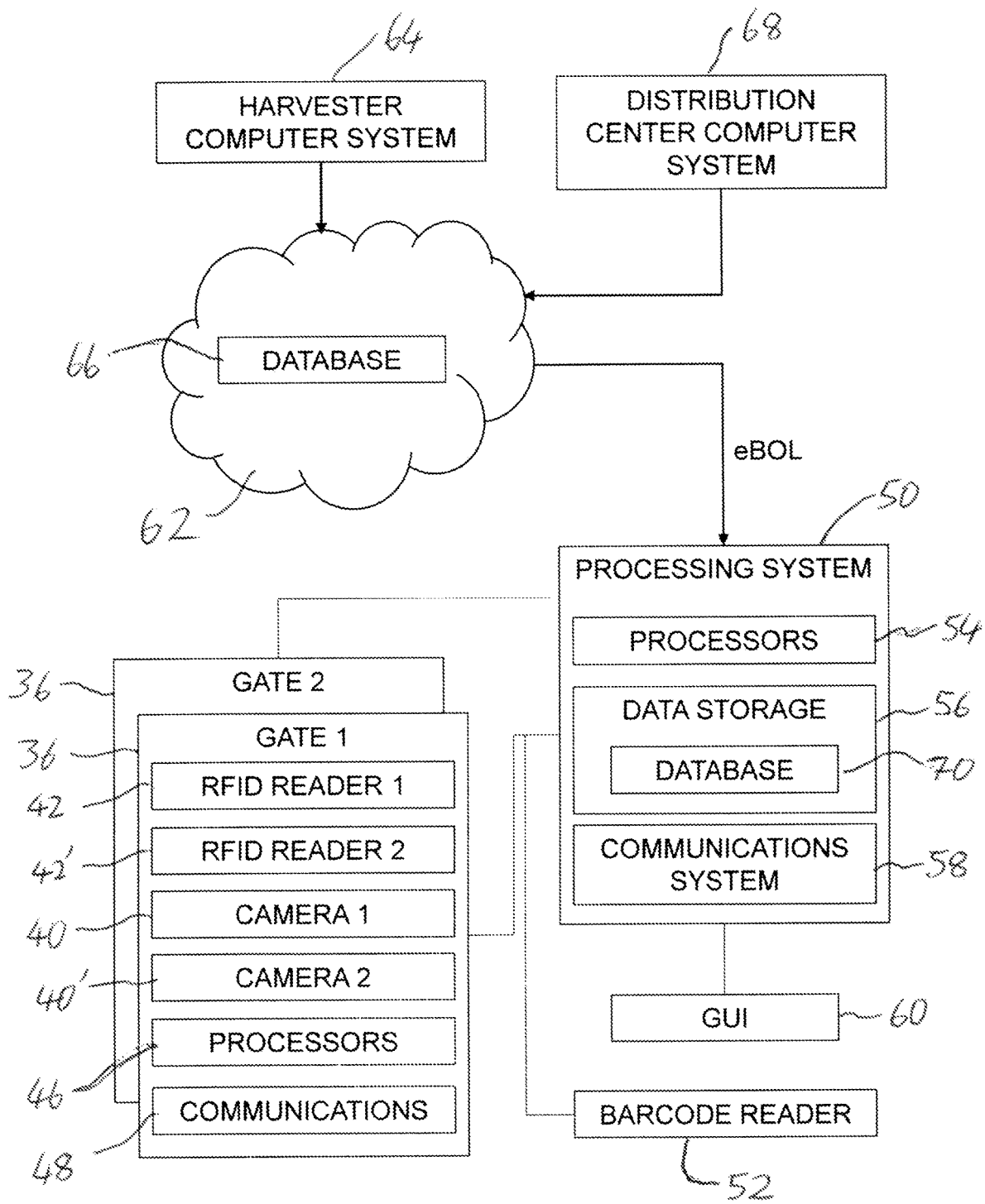
FIG. 4 is a block diagram illustrating a system according to an embodiment of the present invention.

A non-limiting example of an implementation of gate 36 is illustrated schematically in FIG. 3. In this case, gate 36 is implemented as a pair of upright pillars 38, one on each side of the doorway so that people pass between the pillars as illustrated by the arrow. Each pillar preferably carries an imaging sensor (camera) 40, 40' as well as components of an RFID reader (represented by loop antennas) 42. The bilateral deployment of cameras 40 helps to ensure an unobscured view by at least one of the cameras of each container and any associated optically-readable identifier. In certain cases, two sets of RFID reader components 42 and 42' are provided, deployed so as to have two distinct sensing regions 44 and 44', preferably on opposite sides of gate 36. The relative timing of sensing of an RFID by the two readers can then be used to provide an indication of a direction of movement of the corresponding container. Additionally, or alternatively, processing of images from one or both of cameras 40, 40' via standard techniques, such as optical flow processing, may be used to determine a direction of movement associated with any detected container transfer. It should be noted that the above combination of sensors is merely exemplary, and that implementations of gate 36 may have alternative, or additional, sensors, according to the type of container identifier used and any other information which is to be collected. As shown in the context of FIG. 4, gate 36 typically also includes one or more processors 46 for processing the sensor data and communications components 48 for wired or wireless communication of the sensor data, or information derived from that data, to a processing system of the invention. Processing of the sensor data to derive the desired information may be performed by processors 46 that are associated with the sensor arrangement, or by other processing components as described below.

Although the "gate" implementation of the sensor arrangement is believed to be particularly advantageous, it should be noted that other sensor arrangements may also be used to implement the present invention. By way of one further non-limiting example, one or more barcode reader 52 (FIG. 4) may be provided, and employees may be instructed that they are required to use barcode reader 52 to scan each container that is transferred between the back-store area and the sales area, and to indicate the direction of the transfer. The barcode reader may be fixed or tethered at or near doorways 30, or may be implemented as one or more mobile barcode reader with wireless networking associated, for example, with a cart used to move containers around the store, or carried by the employee for personal use.

A processing system 50 is provided in data communication with the sensor arrangement. As illustrated in FIG. 4, processing system 50 typically includes at least one processor 54, non-volatile data storage 56, and a communications system 58, such as a wired or wireless network card, for allowing communications with other parts of the system. A user interface, typically a graphic user interface (GUI) 60, is associated with processing system 50, and typically provides for user input and output in one or more modality, optionally supplemented by audio outputs.

Parenthetically, it should be noted that the various components mentioned herein are described by way of a typical example, but that both the subdivision of components between the physical parts of the system and the subdivisions of functions between those components are somewhat arbitrary and are non-limiting. Thus, the recited components of the processing system may be part of a distributed system including one or more local computers in networked communication with one or more centralized computer system of the retail establishment and/or a remote or cloud-based computing system, such as in a cloud 62, all as will be readily understood by a person ordinarily skilled in the art. The various parts of the system are interconnected by suitable wired or wireless communications infrastructure and communicate using standard communications protocols to form a local and/or wide area network. Dedicated, non-standard communications equipment and/or protocols may also be used.

Processing system 50 is configured, either by software running under a suitable operating system or by use of dedicated hardware, or by a combination of software and hardware, to provide various modules configured to implement the sequences of operations described below, particular with reference to FIGS. 5-7. These functions also embody various methods of the present invention.

Recent initiatives in the field of fresh produce retail, particularly with a view to health and safety, have put increased emphasis on traceability of the source of consignments of fresh produce. Thus, it has become common for containers of fresh produce to be associated with data indicating the source location and harvest date of the produce. In a simple case, this information may be printed on a sticker which is generated by the harvester. However, increasingly, such data is stored electronically, either within an RFID chip built into the container itself or in a separate database indexed by container identifier. In the latter case, referring again to FIG. 4, a computer system 64 operated by the harvester may store product source data in a database 66, which is preferably shared along the distribution chain, including to a distribution center computer system 68, so as to maintain traceability. By way of one non-limiting example, availability of the product data database may be ensured by locating the database in a cloud 62. After assembly of containers on pallets for shipping to retail destinations, the distribution center computer system 68 typically rearranges the data to construct an electronic Bill of Lading ("eBOL") containing the data corresponding to the produce in specific containers included in each consignment.

In certain preferred implementations, the data associated with a consignment includes additional data helpful for determining a period of salability for the produce. A combination of the product type and the harvest date are sufficient to provide an initial estimate of a period of salability or an expiration date, assuming that the conditions of cooling and humidity have been kept within defined limits throughout the distribution chain. In some cases, sensors for temperature and/or humidity may be associated with shipments, either carried by shipping vehicles and deployed in warehouses, or in some cases integrated with a pallet carrying the containers, and data from such sensors may be used to calculate an updated estimate of the period of salability. Even without such sensors, information about specific incidents, such as failure of a cooling system during a specific leg of distribution shipping or storage, may be manually entered and used to derive an adjustment for the estimated period of salability for each container affected by the incident. In some cases, such data may be stored in terms of "cold-chain" data indicative of the storage and shipping conditions history. Additionally or alternatively, the data may be turned into an updated expiration date to be stored in relation to the container. All such data which expresses, relates to, or can contribute to estimation of, a period of salability is referred to herein collectively as "freshness data".

While the above-mentioned freshness data may exist in the online database and may be employed in the various distribution chain warehouses, existing arrangements in retail stores are "low-tech" and do not provide any manner for using such data. More often than not, the sales floor manager sees that the crate of cucumbers is getting low and tells a junior employee to "go get a crate of cucumbers." The junior employee may select arbitrarily the first crate of cucumbers to come to hand or, in a best-case scenario, may remember to take from the earlier-delivered stock before the more recently delivered stock. However, he has no way to know whether the crate he has in hand is really the crate with the most imminent expiration date. The result is that, not infrequently, produce in back-store storage becomes unsalable while other produce of the same type with a longer potential period of salability has already been sold. This causes major financial loss and wastage of resources.

An aspect of the present invention addresses this problem by providing assistance to a staff member to select a "priority" container, and providing enforcement to act on cases where an incorrectly prioritized container is moved to the sales area.

Figure 5:
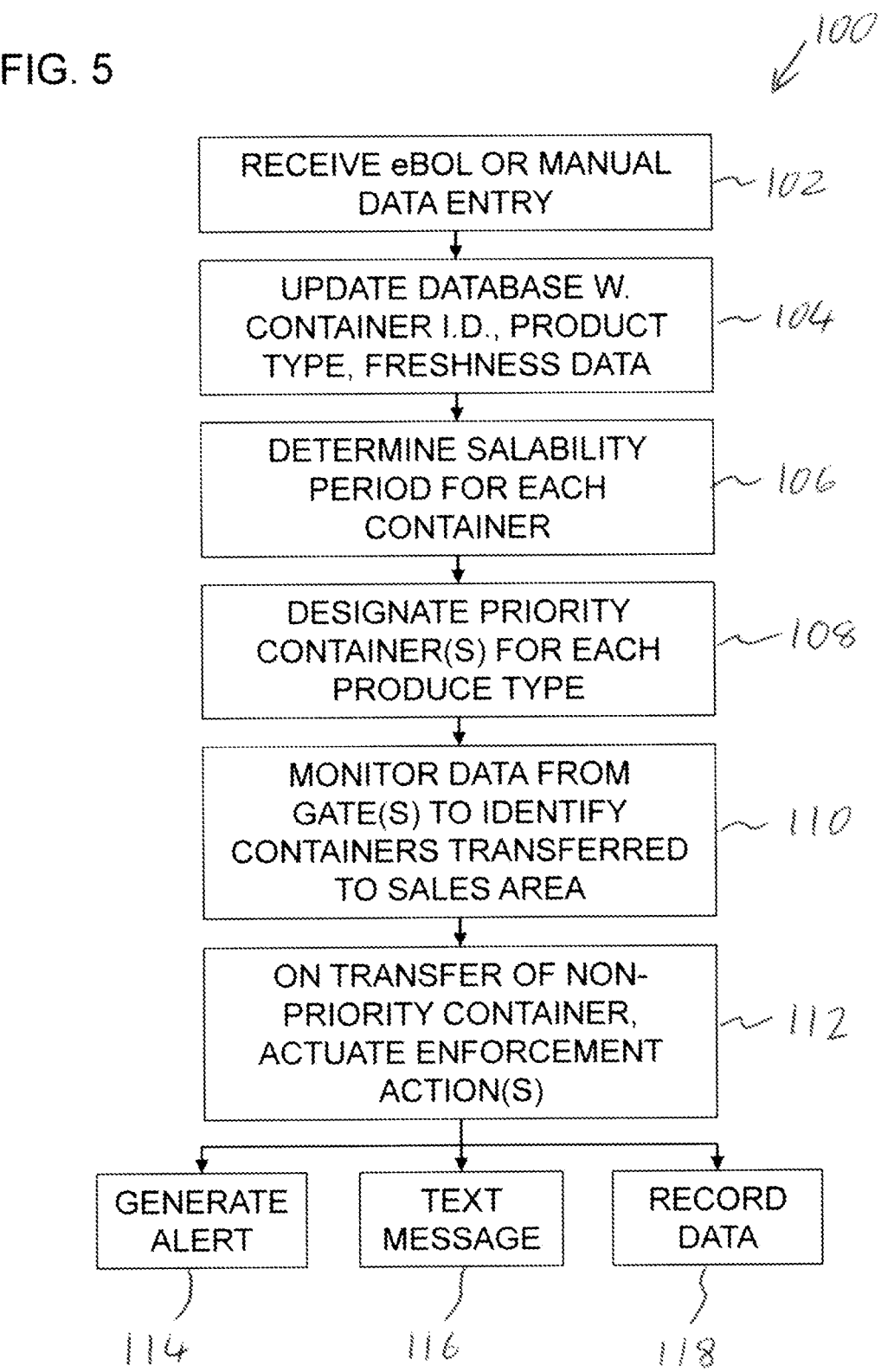
FIG. 5 is a flow diagram illustrating operation of the system of FIG. 4 according to a first aspect of the present invention enforcing correct prioritizing of containers of produce.

Specifically, turning to FIG. 5, this illustrates the operational flow of the system of the present invention and corresponding method, designated 100, according to one aspect of the invention, providing enforcement of a prioritized order for use of back-store area containers to replenish the sales area display.

Firstly, at 102 the system receives data corresponding to each consignment of produce received. In the case of an electronic Bill of Lading (eBOL), this data is preferably derived directly from the received information, with or without manual intervention. Where electronic data is not available, it may be entered manually. The data is then used at 104 to update a database (70 in FIG. 4) to as to include a record for each container 18 of produce received to back-store area 14. Each container record preferably includes a produce type and freshness data, as defined above, typically including the harvest date and/or an expiration date, and preferably also "cool-chain" data indicative of whether proper storage conditions have been maintained throughout the distribution chain. Data regarding any disruptions to the cool-chain is preferably sufficient to allow calculation of their impact on the salability period of the product. Any entry indicating that the corresponding container contains produce which is after its calculated expiration date preferably generates a flag/alert to the system operators to check and remove the offending container.

Although database 70 is shown here within the data storage 56 of processing system 50, it will be noted that the database may be provided in any suitable data storage device, which may be a local back-office networked storage system operating a RAID array, may be a centralized storage system of a chain of stores located at a remote location, or may be implemented on a cloud server using dynamically allocated resources, all as is known in the art.

Parenthetically, although particularly preferred implementations of the present invention ensure prioritizing of containers according to earliest expiration date, in the event that such data is not available, this enforcement aspect of the invention is still of value if implemented using only the "date received in store" as the best-available "freshness data". In this case, the system operates as a first-in first-out (FIFO) enforcement system. However, as mentioned above, FIFO operation is non-optimal, and more reliable "freshness data" indicative of the expected salability period should be used wherever available.

At 106, the system determines for each container a salability period, typically either in terms of remaining days or as an expiration date. Where the freshness data includes an already-calculated expiration date, no calculation is required. Where a harvest date and cool-chain data are provided, these are used to calculate the remaining salability period (optionally in the form of an expiration date). The salability period is used at 108 to designate one or more containers of each produce type in the back-store area as "priority containers" having a shortest remaining salability period as derived from the freshness data. Where the freshness data includes an already-calculated expiration date, the priority containers are typically simply the containers with the earliest expiration date. Where a harvest date and cool-chain data are provided, the shortest remaining salability period (or earliest calculated expiration date) is identified. All containers sharing the earliest expiration date are designated as "priority containers", indicating that these are the containers of that product type which should be used first to replenish the sales area.

At 110, the system monitors data from the sensor arrangement to identify containers 18 transferred along the produce transfer path from the back-store area to the sales area. Options for implementing the sensor arrangement, including gate(s) 36 and barcode reader 52, were discussed above. Various degrees of processing may be required to detect and retrieve container identifiers, depending on the sensor technology used, which may be performed either by processing components of gate 36 or by processing system 50.

At 112, when a container is detected being transferred from the back-store area to the sales area, the identifier is compared to the list of priority containers to verify that the container is indeed a "priority container" that is intended for next use. If a container other than a priority container is transferred from the back-store area to the sales area, at least one enforcement action is actuated. The enforcement action typically includes one or more of the following: generating an audible or visual alert 114 in order to prompt the employee to return the incorrect container and take in hand one of the priority containers; forwarding a message 116 to a communications device, such as a mobile device carried by a store manager; and recording information 118 sufficient to identify a person who transferred the container, for example, via an RFID tag carried by the employee or by storing one or more image of the event, for subsequent educational or disciplinary follow-up.

Clearly, the above steps present a logical progression rather than a sequential process, and do not occur in a fixed sequence. The monitoring of 110 is preferably continuous, whereas the updating of 104-108 is typically performed intermittently, triggered by receipt of a new consignment or by changes in the back-store stock occurring when containers are transferred to the sales area.

Parenthetically, it will be noted that the maintenance of a database that, at any time, contains a precise record of the containers of fresh produce in storage area 16 and their expected periods of salability is also a powerful tool for management of stock levels of fresh produce and reordering. Thus, the system may advantageously apply reorder criteria to the database, intermittently or on demand, so as to generate an order for new produce based at least in part on the total quantity of each produce type currently in the back-store area. This allows for much more precise and timely reordering of produce than could be achieve when relying on checkout data only, as is common in this field.

Figure 6:
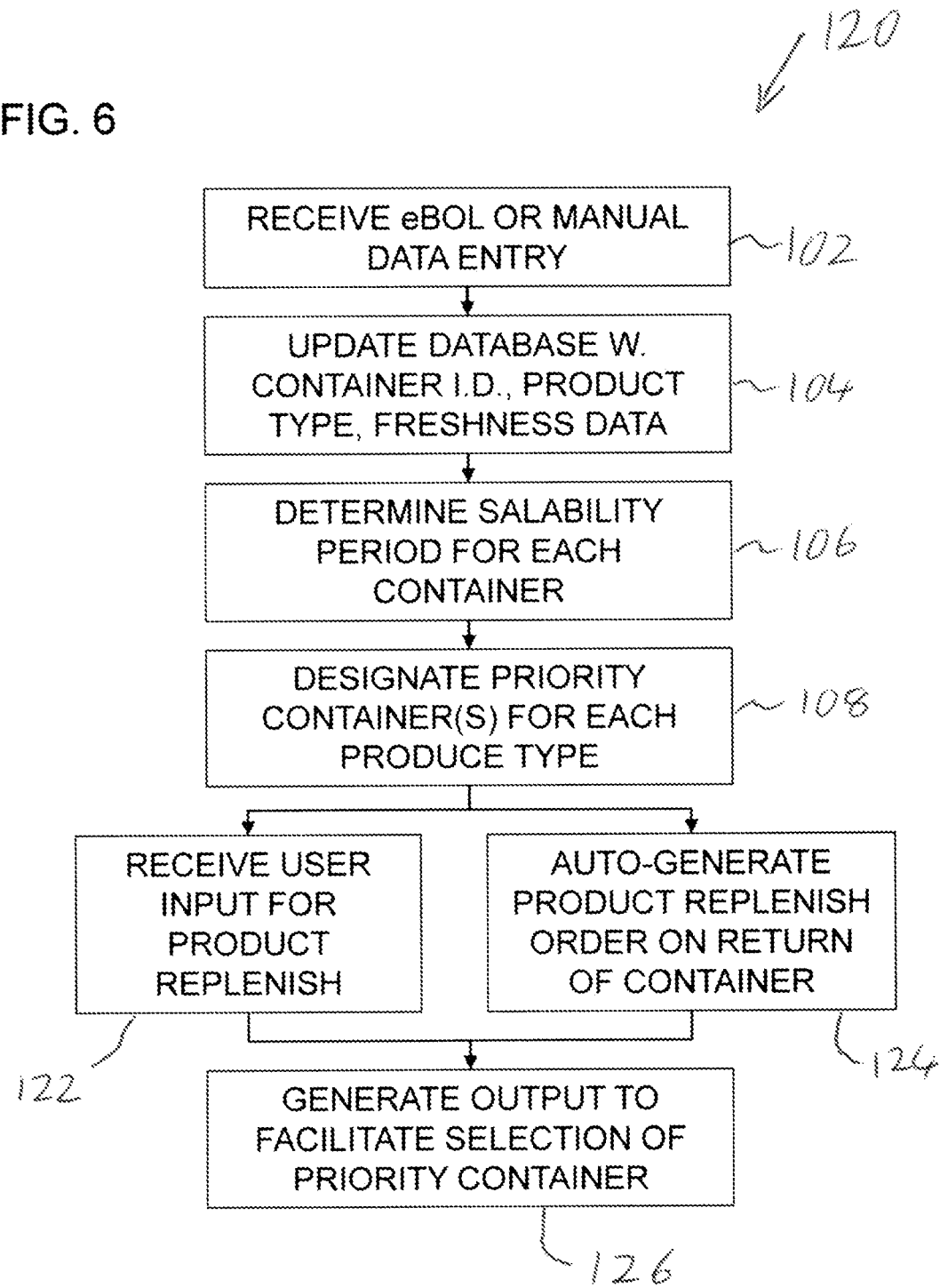
FIG. 6 is a flow diagram illustrating operation of the system of FIG. 4 according to a further aspect of the present invention facilitating correct prioritizing of containers of produce.

Turning now to FIG. 6, this illustrates the operational flow of the system of the present invention and corresponding method, designated 120, according to a further aspect of the invention, providing information to assist an employee correctly select a prioritized containers to replenish the sales area display. This process complements, and preferably coexists, with process 100 described above, and is based on the same underlying process of items 102-108 to define the "priority containers" which should be next to use. These processes were described in the context of FIG. 5.

The process for assisting selection of a priority container occurs responsive to a sales area replenish requirement for a given produce type. Such a request may be generated at 122 by a user input indicating a need for replenishing the sales display of a given product. Additionally, according to a further aspect of the present invention, a replenish requirement (refill request) for a given product type may be automatically generated 124 in response to return of a container from the sales area to the back-store area, indicative that an empty container of that product type has just been removed from the display. The automatic generation of a refill request is preferably conditional such that it is not generated when return of the container was preceded within a given time period (for example, half an hour) by transfer of a different container of the same produce type from the back-store area to the sales area, which would indicate that the empty returned container may already have been replaced.

In either case, the system is preferably responsive to the replenish requirement to generate an output 126 via user interface 60 to provide information to facilitate manual selection of the priority container of the given produce type. This information may take any of a number of forms, such as one or more of the following:

In a most basic case example, the information may be a display or audible message indicating the number of available "priority containers" of the desired product type available. In many cases, the information that the employee needs to look for certain specific containers, and how many containers are in the relevant group, may be sufficient to greatly increase the chances of selecting the correct container first time.

Additional helpful information may be in the form of identifying an arrival date and/or source of the consignment containing the priority containers. Store employees are typically aware of various rules of logistics implemented in the back-store area for positioning of goods, and such information typically allows correct selection of one of the priority containers.

The system may also provide the relevant container identifiers. These may be displayed on a screen of GUI 60 and allow the employee to remember, for example, the last few digits of some or all of the priority containers, and then to look for that number printed alongside a barcode on the containers. The identifiers may also be provided to a standard or dedicated mobile barcode reader or RFID reader device, which may then generate a confirmation signal (via a visual e.g. green/red display or by generating two types of "beep") on scanning of a container identifier, thereby indicating confirmation or rejection of the scanned container as a "priority container".

Where infrastructure exists to allow in-store tracking of container positions, for example, by tracking "beacons" integrated with the containers, or by image processing-based tracking using fixed surveillance cameras deployed around the store, the information may include specific information as to the location of the priority containers in storage area 16, for example, displayed on a map of the storage area shown on a screen of GUI 60.

Preferably, process 120 runs in parallel with enforcement process 100 described above, such that, if the employee still fails to identify the correct priority container, he or his supervisor will be alerted to the error and corrective action can be taken.

Figure 7:
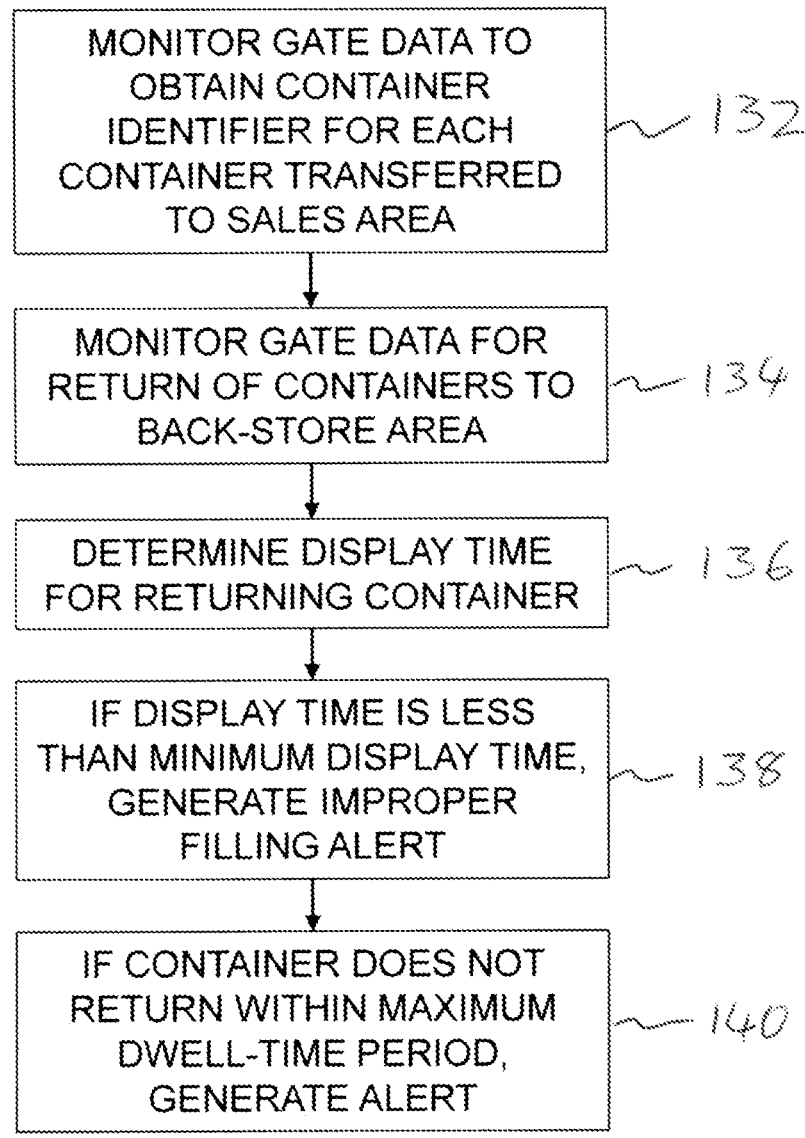
FIG. 7 is a flow diagram illustrating operation of the system of FIG. 4 according to a still further aspect of the present invention for monitoring produce refilling practices.

Turning now to FIG. 7, a further aspect of the present invention relates to enforcement of "best practices" in relation to refilling procedures on the sales floor. In a typical scenario in which a container of fresh produce is brought out while a relatively small amount of the same produce type is left in the previous container, the proper procedure is to remove the old container, place the new, full container in the sales display, and then tip the remaining contents of the old container on top of the new produce. In practice, employees are often tempted to perform the simpler single action of tipping the new contents on top of the old. This however leads to an accumulation of old produce at the bottom of the containers which may, particularly if repeated, lead to early onset of spoiling of the container contents, leading to wastage of new produce well before its expiration date. This improper filling practice is currently very difficult for a store manager to detect, since the appearance of the upper contents of the improperly-refilled container is fresh produce indistinguishable from the top of a properly installed replacement container.

FIG. 7 illustrates the operational flow of the system of the present invention and corresponding method, designated 130, according to further aspects of the invention. It will be noted that these aspects of the present invention do not require the aforementioned freshness data, and can be implemented independently of processes 100 and 120 described above.

According to this aspect of the present invention, the sensor arrangement obtains a container identifier for each container 18 transferred from back-store area 14 to sales area 12 (process 132), and monitors for return of the container 18 from sales area 12 to back-store area 14. For this purpose, the sensor arrangement is preferably configured to collect data sufficient to distinguish between containers passing from back-store area 14 to sales area 12 and vice versa, such as the preferred examples of gate 36, described above.

At 136, for each returning container, the processing system determines a "display time" corresponding to the amount of time from when the container was taken out to the sales area until it returned from the sales area. At 138, if this display time is less than a predefined minimum display time, the system generates an improper-refilling alert. The minimum display time is chosen such that, under normal sales conditions, it is not feasible, or is at least very unlikely, that the entire contents of the container would have be sold during such a short period on the sales display. Any container returning prior to that period is likely to have been emptied into another container according to the above-mentioned improper refilling practices. This criterion may be selectively applied according to produce type. For example, certain produce (e.g., bananas) are sometimes transferred immediately to a specially designed display unit rather than being sold from the container, so immediate return of a banana container may not require any alert or intervention. The alert may take any suitable form including, for example, the various alert types 114, 116 or 118 described above with reference to FIG. 5, to allow for suitable corrective action, as well as educational and/or disciplinary follow-up.

Process 140 illustrates a further aspect of the invention, which may be used independently of steps 136 and 138, but is most preferably used to supplement them. According to process 140, if a given container has not been sensed by monitoring process 134 within a given maximum dwell-time period from when it was transferred to sales area 12, an alert is generated. The maximum dwell-time is preferably a measure of the maximum time that the produce can be in the sales display and still maintain an acceptable produce quality for presentation to the customer. In certain implementations, the maximum dwell-time may be set universally for all produce, using for example a limit of 3 days, since it is reasonable to generate an alarm regarding a container that is stalled on the sales floor for 3 days, even in the case of produce with a relatively long shelf-life. More preferably, a produce type-specific maximum dwell-time is defined for each type of produce, such that an alert will be generated in relation to more rapidly deteriorating produce after a shorter period. Here too, the options for implementation of an alert include the same options as mentioned above.

In this case, there are a number of different reasons why a maximum dwell-time may be exceeded which may require differing forms of intervention. One possibility is an improper refilling procedure as described above, where the refilled container would be left in the display for an extended period. Other situations include where turn-over of a certain produce type is slow such that the time taken for regular sales to empty a single container exceeds the maximum dwell-time. In that case, the alert serves to inform the staff that there is a container on display which may have contents that are no longer fit for display on the sales floor and should be replaced. If such alerts or conditions occur repeatedly for a given produce type, this may be indicative that the "pack size" used for supplying that produce type to the store should be changed to a smaller size which will allow emptying of the containers by normal sales within an acceptable timeframe.

It will be appreciated that the above descriptions are intended only to serve as examples, and that many other embodiments are possible within the scope of the present invention as defined in the appended claims.

What is claimed is:

1. A system for managing produce in a retail store having a sales area for sale of produce and a back-store area including at least one storage area for pre-sale storage of produce, the produce being supplied in containers having distinct container identifiers, the system comprising:
   (a) a sensor arrangement including at least one sensor configured to collect data sufficient to determine a container identifier, said sensor arrangement being deployed to read container identifiers for containers passing along a produce transfer path from the back-store area to the sales area;
   (b) a processing system including at least one processor, said processing system being in data communication with said sensor arrangement to receive said data; and
   (c) a user interface associated with said processing system,
wherein said processing system is configured:
   (i) to maintain a database including a record for each container of produce received to the back-store area, each container record including a produce type and freshness data,
   (ii) for each produce type, to determine at least one container identifier corresponding to at least one container of the given produce type in the back-store area having a shortest salability period as derived from said freshness data, said at least one container being designated a priority container,
   (iii) to monitor said data from said sensor arrangement to identify containers transferred along said produce transfer path from said back-store area to said sales area, and
   (iv) on transfer of a container other than a priority container from said back-store area to said sales area, actuating at least one enforcement action selected from the group consisting of: generating an audible or visual alert; forwarding a message to a communications device; and recording information sufficient to identify a person who transferred the container.

2. The system of claim 1, wherein said freshness data of each container record of said database comprises a date selected from the group consisting of: a harvest date; and an expiration date.

3. The system of claim 1, wherein said freshness data of each container record of said database comprises data relating to temperature of storage conditions and/or shipping conditions for at least one period from harvesting to arrival in the retail store.

4. The system of claim 1, wherein said processing system is further responsive to a sales area replenish requirement for a given produce type to generate an output via said user interface to provide information to facilitate manual selection of said priority container of the given produce type.

5. The system of claim 1, wherein said processing system is further configured:
   (a) on transfer of a container from said back-store area to said sales area, to update said database to maintain a record of a total quantity of each produce type currently in said back-store area; and
   (b) intermittently or on demand, to apply reorder criteria to said database so as to generate an order for new produce based at least in part on said total quantity of each produce type currently in said back-store area.

6. The system of claim 1, wherein said sensor arrangement is further configured to collect data sufficient to distinguish between containers passing from the back-store area to the sales area and containers passing from said sales area to said back-store area.

7. The system of claim 4, wherein said processing system is further configured to be responsive to return of a container from said sales area to said back-store area to generate a sales area replenish requirement for the corresponding produce type unless return of said container was preceded within a given time period by transfer of a different container of the same produce type from said back-store area to said sales area.

8. The system of claim 4, wherein said processing system is further configured to determine for each container returning from said sales area to said back-store area a display time from when said container was transferred from said back-store area to said sales area and, if said display time is less than a predefined minimum display time, generating an improper-refilling alert.

9. The system of claim 4, wherein said processing system is further configured:
   (a) to determine for each container transferred from said back-store area to said sales area a latest expected return date; and
   (b) if said container has not been returned from said sales area to said back-store area by said latest expected return date, to generate an alert.

10. The system of claim 1, wherein said at least one sensor comprises at least one camera deployed for sampling images of containers passing along said produce transfer path.

11. The system of claim 8, wherein said processing system is further configured to process images from said at least one camera so as to locate and read from within said images an optically readable container identifier associated with at least one container.

12. The system of claim 8, wherein said processing system is further configured to process images from said at least one camera so as to determine a direction of transfer of a container along said produce transfer path.

13. The system of claim 1, wherein said at least one sensor comprises at least one RFID gate deployed for reading an RFID container identifier of a container passing a location along said produce transfer path.

14. The system of claim 11, wherein said RFID gate is configured to determine a direction of transfer of a container along said produce transfer path.

15. A system for managing produce in a retail store having a sales area for sale of produce and a back-store area including at least one storage area for pre-sale storage of produce, the produce being supplied in containers having distinct container identifiers, the system comprising:
   (a) a sensor arrangement including at least one sensor configured to collect data sufficient to determine a container identifier, said sensor arrangement being deployed to read container identifiers for containers passing along a produce transfer path from the back-store area to the sales area;
   (b) a processing system including at least one processor, said processing system being in data communication with said sensor arrangement to receive said data; and
   (c) a user interface associated with said processing system,
wherein said processing system is configured:
   (i) to maintain a database including a record for each container of produce received to the back-store area, each container record including a produce type and a freshness data, (ii) for each produce type, to determine at least one container identifier corresponding to at least one container of the given produce type in the back-store area having a shortest salability period as derived from said freshness data, said at least one container being designated a priority container, and (iii) responsive to a sales area replenish requirement for a given produce type, to generate an output via said user interface to provide information to facilitate manual selection of said priority container of the given produce type.

16. A system for managing produce in a retail store having a sales area for sale of produce and a back-store area including at least one storage area for pre-sale storage of produce, the produce being supplied in containers having distinct container identifiers, the system comprising:

(a) a sensor arrangement including at least one sensor configured to collect data sufficient to determine a container identifier, said sensor arrangement being deployed to read container identifiers for containers passing along a produce transfer path from the back-store area to the sales area, said sensor arrangement being further configured to collect data sufficient to distinguish between containers passing from the back-store area to the sales area and containers passing from said sales area to said back-store area;

(b) a processing system including at least one processor, said processing system being in data communication with said sensor arrangement to receive said data; and (c) a user interface associated with said processing system, wherein said processing system is configured:

(i) to maintain a database including a record for each container of produce received to the back-store area, each container record including a produce type, and (ii) to be responsive to return of a container from said sales area to said back-store area to generate a sales area replenish requirement for the corresponding produce type unless return of said container was preceded within a given time period by transfer of a different container of the same produce type from said back-store area to said sales area.

17. A system for managing produce in a retail store having a sales area for sale of produce and a back-store area including at least one storage area for pre-sale storage of produce, the produce being supplied in containers having distinct container identifiers, the system comprising:

(a) a sensor arrangement including at least one sensor configured to collect data sufficient to determine a container identifier, said sensor arrangement being deployed to read container identifiers for containers passing along a produce transfer path from the back-store area to the sales area, said sensor arrangement being further configured to collect data sufficient to distinguish between containers passing from the back-store area to the sales area and containers passing from said sales area to said back-store area;

(b) a processing system including at least one processor, said processing system being in data communication with said sensor arrangement to receive said data; and (c) a user interface associated with said processing system, wherein said processing system is configured to process data from said sensor arrangement so as:

(i) to obtain a container identifier for each container transferred from said back-store area to said sales area, (ii) to monitor for return of said container from said sales area to said back-store area, (iii) to determine a display time for said container from transfer to said sales area until return to said back-store area and, if said display time is less than a predefined minimum display time, generating an improper-refilling alert.

18. A system for managing produce in a retail store having a sales area for sale of produce and a back-store area including at least one storage area for pre-sale storage of produce, the produce being supplied in containers having distinct container identifiers, the system comprising:

(a) a sensor arrangement including at least one sensor configured to collect data sufficient to determine a container identifier, said sensor arrangement being deployed to read container identifiers for containers passing along a produce transfer path from the back-store area to the sales area, said sensor arrangement being further configured to collect data sufficient to distinguish between containers passing from the back-store area to the sales area and containers passing from said sales area to said back-store area;

(b) a processing system including at least one processor, said processing system being in data communication with said sensor arrangement to receive said data; and (c) a user interface associated with said processing system, wherein said processing system is configured to process data from said sensor arrangement so as:

(i) to obtain a container identifier for each container transferred from said back-store area to said sales area, (ii) to monitor for return of said container from said sales area to said back-store area, and (iii) if said container has not been returned from said sales area to said back-store area within a defined maximum dwell-time period after transfer to said sales area, to generate an alert.

* * * * *